United States Patent Office 2,786,049
Patented Mar. 19, 1957

2,786,049

SYNTHESIS OF PEPTIDE STRUCTURES

Harold P. Lundgren, Berkeley, Mayo K. Walden, El Cerrito, and William Gordon Rose, Berkeley, Calif., assignors to the United States of America as represented by the Secretary of Agriculture No Drawing. Application February 20, 1956,
Serial No. 566,736

10 Claims. (Cl. 260—112)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to organic synthesis and particularly to procedures for preparing compounds containing peptide linkages. The objects of the invention include the provision of methods for preparing peptides from amino acids or from peptides having a lesser number of peptide linkages than the peptide product.

A particular object of the invention is the provision of procedures whereby peptide bond formation is achieved under mild conditions so that no degradation of reactants is involved. A further object of the invention is the provision of procedures whereby peptide bond formation is achieved without the necessity of first preparing derivatives of the reactants. For example, in prior techniques it is necessary to convert carboxyl groups to carbonyl halide groups in order to achieve coupling with the amino radical-containing reactants. In the process of this invention the carboxyl groups are employed as such and need not be converted into other groups. A further object of the invention is the provision of procedures whereby peptide bond formation is achieved in a simple and expeditious manner. Additional objects and advantages of the invention will be obvious from the description set forth herein.

In organic synthesis it is often necessary to form peptide linkages, that is, bridging structures of the type

which connect other organic radicals. Synthesis of such structures is particularly important in the field of chemistry dealing with proteins, peptides, and amino acids. In preparing synthetic peptides it is necessary to couple amino acids through such peptide linkages. Generally such syntheses are complicated and require preparation of intermediate compounds. Thus, peptide linkages are difficult to form directly by interaction of carboxyl and amino groups without employing such high temperatures that the reactants or the products are subject to decomposition. To allow the reaction to be conducted under milder conditions it is necessary to first prepare intermediates. For example, the carboxyl group of one reactant is converted into a carbonyl halide radical. This radical can then be coupled with the amino radical of the other reactant to form the desired peptide linkage at reasonably low temperatures.

It has now been found that peptide linkages can be established under mild conditions by direct interaction of a carboxyl radical and an amino radical. Such synthesis is made possible by conducting the reaction in the presence of an ester of a titanium-containing acid, for example, tetrabutyl orthotitanate. The role of the titanate in the synthesis is not fully understood. It is believed that it acts first to form chelate complexes with the reactants, these intermediates then forming the end product wherein the original —COOH radical and —NH$_2$ radical are converted into a —CONH— radical. At any rate it has been established by laboratory tests that the titanate does operate to accelerate and promote the synthesis of peptide linkages. A typical reaction in accordance with the invention involves intimately contacting the titanate promoter with the compound (or compounds) containing the amino and carboxyl radicals. After the reaction is completed, the products are separated from the reaction mixture. The type of product will, of course, depend on the nature of the starting material.

Usually it is preferred to establish a solution containing the reactants and the ester of the titanium-containing acid whereby the most intimate contact is made possible. The preferred titanic acid esters are liquid and these act at least in part to establish the solution. Additional solvent such as methanol, ethanol, isopropanol, propanol, any of the isomeric butanols, acetone, 2-methoxyethanol, or the like is preferably added to get complete solution. Usually, the reaction is carried out under substantially anhydrous conditions although the system need not be rigorously or absolutely anhydrous. The process may be carried out in a wide range of temperatures depending on the type of reactants and products involved. When the materials are sensitive to heat the reaction may be carried out at room temperature or even lower, for example, as low as 0° C. Naturally, the rate of reaction will be slow at such temperatures, so that in many cases reaction may require several months; however, satisfactory yields may be obtained in less than a day in some cases. To accelerate the reaction, heat may be applied, the temperature used being in any case below that at which appreciable decomposition of reactants or product would occur. A convenient technique is to boil the reaction solution under reflux in which case the reaction temperature will be that corresponding to the boiling point of the solvent used, for example 78° C. where the solvent is alcohol. In some cases where it is desired or necessary to obtain a high temperature, a solvent of higher boiling point is used, for example, 2-methoxy ethanol (B. P. 124.5° C.), 2-ethoxy ethanol (B. P. 135° C.), 2-butoxy ethanol (B. P. 171° C.), 2-hexyloxy ethanol (B. P. 208° C.), phenyl methyl carbinol (B. P. 204° C.), etc. It is evident from the above that the temperature of reaction can vary from about 0° C. to about 200° C. and that within this range one may select a specific temperature depending upon such factors as rate of reaction desired, heat sensitivity of reactants and product, etc.

The proportion of reactants to be employed may be varied depending on the type of product desired. For example, in preparing a peptide from a mixture of a first amino acid and a second amino acid, one would use equimolecular proportions of these reactants if the aim is to produce a peptide containing the same number of units derived from each of the two amino acids. If, however, the aim is to produce a peptide containing twice as many units of the first amino acid for each unit of the second amino acid, one would then employ a reaction mixture containing 2 moles of the first amino acid per mole of the second amino acid. Where the individual amino acids exhibit different relative reactivities, it may be necessary to vary the proportions of the amino acids to get the desired peptide. In any particular case, the proper proportions can be determined by carrying out a series of pilot experiments using different proportions of reactants and noting the one which gives the desired peptide end product. Further extensions of these principles will be obvious to those skilled in the chemical arts. With regard to the reaction promoter, the ester of the titanium-containing acid, this compound is generally employed in a proportion of at least one mole of ester, preferably two moles, per mole of amino acid (or peptide) reactant. In most cases, the titanium ester is employed in a dual role, as promoter and solvent, and for this reason it is commonly used in great excess over the above-cited range.

After completion of the reaction, the products can be recovered in various ways. In many cases the products will precipitate out of the reaction solution. In such case they can be separated by centrifugation, decantation or the like, and washed with petroleum ether or other inert solvent to remove excess reactants. The resulting product can be recrystallized from water, alcohol, acetone or other suitable crystallizing solvent.

In cases where the product does not separate from the reaction solution, a treatment is first carried out to hydrolyze all of the titanate ester. To this end, the reaction mixture is diluted with water and heated if necessary. The resulting mixture is evaporated preferably under vacuum to remove water and alcohol (both solvent and that formed from hydrolysis of the titanate ester). The residue is then extracted with a solvent suitable for removing the unreacted reagents, or, in the alternative the product, from the reaction mixture.

As the promoter for the peptide bond synthesis we may employ any of the esters of various titanium-containing acids, as for example, orthotitanic acid, metatitanic acid, pyrotitanic acid, titanous acid, and so forth. The alcohol (or phenol) moiety of the esters may include radicals of the aliphatic, aromatic, alkyl, aralkyl, or cycloaliphatic types, as for example, ethyl, propyl, butyl, amyl, hexyl, octyl, phenyl, benzyl, methylphenyl, cyclohexyl, naphthenyl, and so forth. Included are esters wherein different radicals are attached to the acid moiety and also included are esters wherein the titanium-containing acid is wholly esterified or only partly esterified. Some particular esters included in the scope of this invention, are, for example, Tetraethyl orthotitanate,
Tetrapropyl orthotitanate,
Tetrabutyl orthotitanate,
Tetraamyl orthotitanate,
Tetrahexyl orthotitanate,
Tetraoctyl orthotitante,
Tetracyclohexyl orthotitanate,
Tetraphenyl orthotitanate,
Tetrabenzyl orthotitanate,
Tetratolyl orthotitanate,
Monoethyl tripropyl orthotitanate,
Monoethyl tributyl orthotitanate,
Monoethyl triamyl orthotitanate,
Monoethyl trihexyl orthotitanate,
Monoethyl trioctyl orthotitanate,
Monoethyl tricyclohexyl orthotitanate,
Monoethyl triphenyl orthotitanate,
Monoethyl tribenzyl orthotitanate,
Monoethyl tritotyl orthotitanate,
Dibutyl diethyl orthotitanate,
Dibutyl dipropyl orthotitanate,
Dibutyl diamyl orthotitanate,
Dibutyl dihexyl orthotitante,
Dibutyl dioctyl orthotitanate,
Dibutyl dicyclohexyl orthotitanate,
Dibutyl diphenyl orthotitanate,
Dibutyl dibenzyl orthotitanate,
Tributyl monopropyl orthotitanate,
Tributyl monoamyl orthotitanate,
Tributyl monohexyl orthotitanate,
Tributyl monooctyl orthotitanate,
Tributyl monocyclohexyl orthotitanate,
Tributyl monophenyl orthotitanate,
Tributyl monobenzyl orthotitanate,
Tributyl monotolyl orthotitanate,
Tributyl monoisobutylphenyl orthotitanate,
Tetra(2-ethoxyethyl) orthotitanate,
Tetra(2-butoxyethyl) orthotitanate,
Triethyl hydrogen orthotitanate,
Tributyl hydrogen orthotitanate,
Diethyl metatitanate,
Dipropyl metatitanate,
Dibutyl metatitanate,
Diamyl metatitanate,
Diphenyl metatitanate,
Dibenzyl metatitanate,
Ditolyl metatitanate,
Dicyclohexyl metatitanate,
Dihexyl metatitanate,
Dioctyl metatitanate,
Di(2-ethoxyethyl) metatitanate,
Di(2-butoxyethyl) metatitanate, and so forth.

In general, it is preferred to use the esters which are normally liquids as these can also function as solvents to obtain more intimate contact of the reactants. A preferred group of such esters are the alkyl esters of orthotitanic acid, for example tetrabutyl orthotitanate.

The process in accordance with this invention may be applied in various ways. For example, to produce a peptide containing units of a single amino acid, the amino acid is contacted with the titanium ester. By such technique a typical amino acid such as glycine can be converted into peptides containing two or more glycine units. Another application of the process concerns subjecting a mixture of different amino acids to contact with the titanium ester. An example of such application is when the starting mixture contains, say, glycine and alanine whereby the peptide product contains both glycine and alanine units, the proportion of each being dependent on the proportion of each amino acid in the starting mixture. It is obvious that the starting mixture may contain more than two amino acids to obtain peptides composed of a plurality of different amino acid units. Another phase of the invention concerns contacting a pre-formed peptide with the titanium ester whereby to produce a peptide having an increased number of peptide linkages. As an example of such procedure, glycylglycine is contacted with the titanium ester to produce peptides having at least four glycine units. A further modification of the invention involves contacting the titanium ester with a mixture of one or more peptides and one or more amino acids to produce peptides containing units of the original peptide and the amino acids. As an example of such technique, alanylalanine and valine are contacted with the titanium ester whereby to produce peptides containing alanylalanylvalyl units. In summation, the invention can be applied to many different types of systems the essential element being that the ester of the titanium-containing acid is intimately contacted with at least one compound of the group of amino acids and peptides.

The process of the invention can be applied to all types of amino acids. Illustrative examples of such compounds are alanine, glycine, valine, leucine, isoleucine, norleucine, lysine, serine, threonine, phenylalanine, tyrosine, aspartic acid, cystine, methionine, arginine, tryptophane, histidine, proline, hydroxyproline, iodogorgoic acid, and thyroxine. Compounds which are not naturally occurring amino acids can be used to prepare peptide-like structures. Thus one may employ the amino benzoic acids, the amino naphthoic acids, nicotinic acid and so forth. The amino acids are usually employed as such but may also be employed in the form of their salts, for example their sodium salts. In addition, any of the amino acids may in the same way be caused to interact with a peptide or different peptides may be caused to interact with one another. In this way long-chain peptides of molecular weight approaching that of proteins may be synthesized. Such synthetic proteins are highly useful in the field of biochemistry for use as model systems for studying and elucidating the life processes of plants and animals. For example a protein having radioactive sites may thus be prepared and fed to animals. The animal's secretions and organs may then be studied to determine the fate of the protein in order to comprehend more fully the processes of digestion, metabolism, the effect of diseases, and so forth. In preparing such peptides or even synthetic proteins, one can interact amino acids (or the peptides themselves) with such peptides as for example:

Glycyl-glycine,
Glycyl-alanine,
Glycyl-valine,
Glycyl-leucine,
Glycyl-isoleucine,
Glycyl-norleucine,
Glycyl-lysine,
Glycyl-serine,
Glycyl-threonine,
Glycyl-phenylalanine,
Glycyl-tyrosine,
Glycyl-aspartic acid,
Glycyl-cystine,
Glycyl-methionine,
Glycyl arginine,
Glycyl-tryptophane,
Glycyl-histidine,
Glycyl-proline,
Glycyl-hydroxyproline,
Glycyl-iodogorgoic acid,
Glycyl-thryoxine,
Alanyl-glycine,
Alanyl-alanine,
Alanyl-valine,
Alanyl-leucine,
Alanyl-isoleucine,
Alanyl-norleucine,
Alanyl-lysine,
Alanyl-serine,
Alanyl-threonine,
Alanyl-phenylalanine,
Alanyl-tyrosine,
Alanyl-aspartic acid,
Alanyl-arginine,
Alanyl-tryptophane,
Alanyl-histidine,
Alanyl-proline,
Alanyl-hydroxyproline,
Alanyl-iodogorgoic acid,
Alanyl-thryoxine,
Glycyl-glycyl-glycine,
Glycyl-glycyl-alanine,
Glycyl-glycyl-valine,
Glycyl-glycyl-leucine,
Glycyl-glycyl-isoleucine,
Glycyl-glycyl-norleucine,
Glycyl-glycyl-lysine,
Glycyl-glycyl-serine,
Glycyl-glycyl-threonine,
Glycyl-glycyl-phenylalanine,
Glycyl-glycyl-tyrosine,
Glycyl-glycyl-aspartic acid,
Glycyl-glycyl-cystine,
Glycyl-glycyl-methionine,
Glycyl-glycyl-arginine,
Glycyl-glycyl-tryptophane,
Glycyl-glycyl-histidine,
Glycyl-glycyl-proline,
Glycyl-glycyl-hydroxyproline,
Glycyl-glycyl-iodogorgoic acid,
Glycyl-glycyl-thyroxine,
Glycyl-glycyl-glycyl glycine, and so forth.

In some instances, as where for example the number of carbon and nitrogen atoms is conducive to stable ring configuration, a cyclization of the amino acid or peptide can be achieved.

In cases where more than one product may result, such as a glycine and valine dipeptide joined by either the carboxyl group of the glycine or the amino group of the glycine, a single product may be obtained by the use of a derivative inactivating the undesired linkage, such as carbobenzoxy glycine, to form glycine peptide in which the glycine is joined by its carboxyl group. In specific instances this may be achieved more simply by the order of addition or the choice of amino acid salt.

The invention is further demonstrated by the following examples.

*Example I*

(A) 1 gram of glycyl glycine and 25 ml. of tetrabutyl orthotitanate were dissolved in 75 cc. absolute alcohol. The solution was held for 5 days at room temperature with continuous stirring. At the end of this time the precipitated material was separated by centrifugation, washed with hexane and recrystallized from water. A yield of purified diketopiperazine of 0.07 g. was obtained.

(B) In another run, the original solution of glycyl clycine and butyl titanate in alcohol was refluxed (80° C.) for 30 minutes and allowed to stand one week at room temperature. The precipitated product was separated, washed with hexane, and recrystallized from water. A yield of 0.2 g. of purified diketopiperazine was obtained.

The reaction in these cases is illustrated by the equation below:

$$NH_2-CH_2-CONH-CH_2-COOH$$

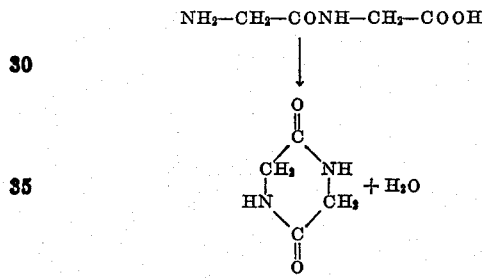

*Example II*

0.5 gram of glycine and 12.5 cc. of tetra (2-ethylhexyl) orthotitanate were dissolved in 37.5 cc. isobutyl alcohol. The solution was heated for 30 minutes on a steam bath then allowed to stand for 2 weeks at room temperature. At the end of this time the precipitate was separated by centrifugation then washed with alcohol and hexane. A yield of 0.17 g. of diketopiperazine was obtained.

*Example III*

One gram of glycine and 14 cc. of tetra (2-ethylhexyl) orthotitanate were dissolved in 36 cc. of isobutyl alcohol by heating on the steam bath for 30 minutes and 1.5 grams of sodium glycinate was added. The solution was stirred for one week at room temperature. At the end of this time the precipitated material was removed by centrifugation. To the supernatant liquid was added 15 cc. water to hydrolyze the titanate ester. The resulting material was evaporated to remove the alcohol, then slightly acidified with dilute hydrochloric acid and centrifuged to remove titanium oxides, sodium titanate, etc. The clear supernatant was evaporated to dryness, thus yielding .82 g. of product containing 0.2 g. of glycylglycylglycine.

*Example IV*

One-half gram of glycylvaline and 12.5 cc. of tetrabutyl orthotitanate were dissolved in 37.5 cc. anhydrous ethanol. The solution was held at room temperature for two months. Water was added and the mixture dried on a steam bath. The residue was extracted with ethanol. The ethanol extract was evaporated to dryness then extracted with hot water. The water extract was evaporated to dryness thus to yield 0.12 g. of isopropyl diketopiperazine of the formula:

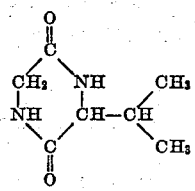

Having thus described our invention, we claim:

1. A process for synthesizing compounds containing a peptide linkage by interaction of a carboxyl radical and an amino radical which comprises intimately contacting at least one compound, selected from the group consisting of amino acids and peptides, with an ester of a titanium-containing acid.

2. A process for synthesizing compounds containing a peptide linkage by interaction of a carboxyl radical and an amino radical which comprises intimately contacting at least one amino acid with an ester of a titanium-containing acid.

3. A process for synthesizing compounds containing a peptide linkage by interaction of a carboxyl radical and an amino radical which comprises intimately contacting a peptide with an ester of a titanium-containing acid.

4. A process for synthesizing compounds containing a peptide linkage by interaction of a carboxyl radical and an amino radical which comprises intimately contacting a mixture of a peptide and an amino acid with an ester of a titanium-containing acid.

5. A process for synthesizing compounds containing a peptide linkage by interaction of a carboxyl radical and an amino radical which comprises intimately contacting a mixture of different amino acids with an ester of a titanium-containing acid.

6. A process for synthesizing compounds containing a peptide linkage by interaction of a carboxyl radical and an amino radical which comprises intimately contacting a mixture of different peptides with an ester of a titanium-containing acid.

7. The process of claim 2 wherein the amino acid is glycine.

8. The process of claim 3 wherein the peptide starting material is glycylglycine.

9. The process of claim 3 wherein the peptide starting material is glycylvaline.

10. The process of claim 4 wherein the peptide starting material is glycylglycine and the amino acid is glycine.

No references cited.